United States Patent
Jeran

[19]

[11] Patent Number: 5,812,183
[45] Date of Patent: Sep. 22, 1998

[54] GEAR TRAIN CONTROL SYSTEM FOR REDUCING VELOCITY INDUCED IMAGE DEFECTS IN PRINTERS AND COPIERS

[75] Inventor: Paul L. Jeran, Meridian, Id.

[73] Assignee: Hewlett-Packard Company, Palo Alto, Calif.

[21] Appl. No.: 689,950

[22] Filed: Aug. 16, 1996

[51] Int. Cl.$^6$ .................................................. G01D 15/10
[52] U.S. Cl. ............................................................ 347/262
[58] Field of Search ................................ 347/104, 262, 347/264; 346/134, 138

[56] References Cited

U.S. PATENT DOCUMENTS

| | | | |
|---|---|---|---|
| 5,376,954 | 12/1994 | Kerr | 346/138 |
| 5,428,371 | 6/1995 | Fox et al. | 347/262 |
| 5,430,477 | 7/1995 | Bachmann et al. | 348/97 |
| 5,462,371 | 10/1995 | Beretta et al. | 400/569 |

*Primary Examiner*—Adolf Berhane

[57] ABSTRACT

A control system used in a printer drive train of the type having a driving gear in meshed engagement with a driven gear so that, upon rotation of the driving gear in a first direction, the driven gear is rotated by the driving gear in a second direction opposite the first direction. The control system includes a first gear in meshed engagement with the driving gear for rotation thereby in the second direction, a second gear in meshed engagement with the first gear for rotation thereby in the first direction, and a coupling mechanism operative between the driven gear in the drive train and the second gear in the control system for selectively transmitting at least a part of the rotational force of the second gear to the driven gear. Any velocity perturbations transmitted down the drive train to the driven gear are inverted and fed back into the drive train through the control system to actively attenuate the velocity perturbations in the driven gear.

16 Claims, 5 Drawing Sheets

GEAR TRAIN CONTROL SYSTEM FOR REDUCING VELOCITY INDUCED IMAGE DEFECTS IN PRINTERS AND COPIERS

FIELD OF THE INVENTION

The invention relates generally to image forming machines such as printers and copiers. More particularly, the invention relates to a gear train control system for reducing velocity induced image defects, commonly known as "banding," in printers and copiers.

BACKGROUND OF THE INVENTION

In a conventional electrophotographic printer, copier or other such image forming machine, sheets of paper or other sheet media are pulled from a stack and fed downstream into the print engine components where the desired image is formed on each sheet. The "pick/feed" operation is typically accomplished using a feed roller that has a frictionally adherent surface. The surface of the roller rotates against the upper surface of the top sheet in the stack to direct the top sheet into the print engine. As each sheet is picked and fed into the print engine, the desired image is being formed on a rotating photoconducting drum, typically using a scanning laser, according to print data transmitted to the printer from, for example, an attached computer. The image is thereafter transferred onto the sheet of paper as the paper passes along in contact with or very close proximity to the photoconducting drum. The photoconducting drum, like the other moving components in the printer, is operatively coupled to the motor through a series of step up and/or reduction gears. The gear train for the photoconductive drum makes the drum rotate at the proper rate relative to the other printer components. It is essential to high print quality that the rotational velocity of the drum be precisely controlled. If the drum velocity changes while the image is being scanned on to the drum or written on the print media, then a defect will occur in the written image. This type of velocity induced defect, commonly known as "banding," is caused by gear to gear "noise" and impulse variations introduced into the drum gear train from other printer components.

Previously, the problem of banding has been addressed by making more refined gears and more precise gear mountings. Other solutions include adding friction to the gear train to dampen out some of the velocity perturbations and increasing tooth to tooth contact to reduce gear train noise. These solutions, which add significant cost to the gear train, do not actively attenuate or cancel out the velocity perturbations. Consequently, any velocity perturbations introduced into the drum gear train will still effect the print quality. The 3M MatchPrint printer uses a separately driven counter-rotating gear system connected to the drum gear train to attenuate or cancel out unwanted velocity perturbations. The 3M system is disadvantageous, however, because of the motor, motor control electronics and extra gears necessitated by a separate counter-rotating gear train. These components add undesireable complexity and cost to the printer.

SUMMARY OF THE INVENTION

The present invention is directed to a low cost control system for reducing velocity induced defects or "banding" in electrophotographic printers and copiers by integrating a counter-rotating gear into the drum gear train. Accordingly, it is one object of the invention to reduce velocity induced defects in print quality in electrophotographic printers, copiers and other such image forming machines. It is another object to actively attenuate velocity perturbations in the photoconductor drive train. It is a further object to provide a low cost control system that reduces velocity induced defects in print quality.

The control system of the present invention is designed for use in any drive train that has a driving gear in meshed engagement with a driven gear. Upon rotation of the driving gear in a first direction, the driven gear is rotated by the driving gear in a second direction opposite the first direction. The control system includes a first gear in meshed engagement with the driving gear for rotation thereby in the second direction, a second gear in meshed engagement with the first gear for rotation thereby in the first direction, and a coupling mechanism operative between the driven gear in the drive train and the second gear in the control system for selectively transmitting at least a part of the rotational force of the second gear to the driven gear. Any velocity perturbations transmitted by the driving gear to the driven gear are simultaneously transmitted by the driving gear to the first gear in the control system. Once in the control system, the velocity perturbations are inverted upon their transmission to the counter-rotating gear—the second gear in the control system—and thereafter fed back into the drive train through the coupling mechanism.

In a second embodiment, the invention includes the drive train into which the control system is incorporated. The drive train includes a driving gear, a drive mechanism operatively coupled to the driving gear, a driven gear in meshed engagement with the driving gear, and a control system. The control system consists of a first gear in meshed engagement with the driving gear, a second gear in meshed engagement with the first gear, and a coupling mechanism operative between the driven gear in the drive train and the second gear in the control system. The drive mechanism, typically an electric motor, is operative to rotate the driving gear in a first direction. The driving gear then rotates the driven gear and the control system first gear in a second direction opposite the first direction. The first gear drives the second gear to rotate the second gear in the first direction, that is, counter to the direction of rotation of the driven gear. The coupling mechanism selectively transmits at least a part of the rotational force of the second gear to the driven gear to effect the desired feed back. Again, any velocity perturbations transmitted down the drive train to the driven gear are inverted and fed back into the drive train to actively attenuate the velocity perturbations in the driven gear.

In a third embodiment of the invention, the control system is incorporated into an image forming machine such as a printer or copier. The image forming machine includes a driving gear, an electric motor operatively coupled to the driving gear for rotating the driving gear in a first direction, a driven gear in meshed engagement with the driving gear for rotation thereby in a second direction opposite the first direction, the control system (summarized above for the second embodiment of the invention), and a print engine for projecting an image on to a page of print media. The print engine has a rotatable member, such as a photoconductive material, for holding a toner image. The rotatable member is operatively coupled to and is turned by the driven gear. The image forming machine preferably also includes a print media supply mechanism operatively coupled to the print engine for supplying pages of print media to the print engine, a formatter operatively coupled to the print engine for supplying data representing a desired print image to the print engine, and a printed page output mechanism operatively coupled to the print engine for outputting printed pages from the print engine. In this embodiment of the invention, any velocity perturbations transmitted down the drive train to the driven gear are attenuated by the control system before they reach the rotatable member where they might otherwise cause a defect in the image transferred to the print media.

DETAILED DESCRIPTION OF THE INVENTION

Figure 1:
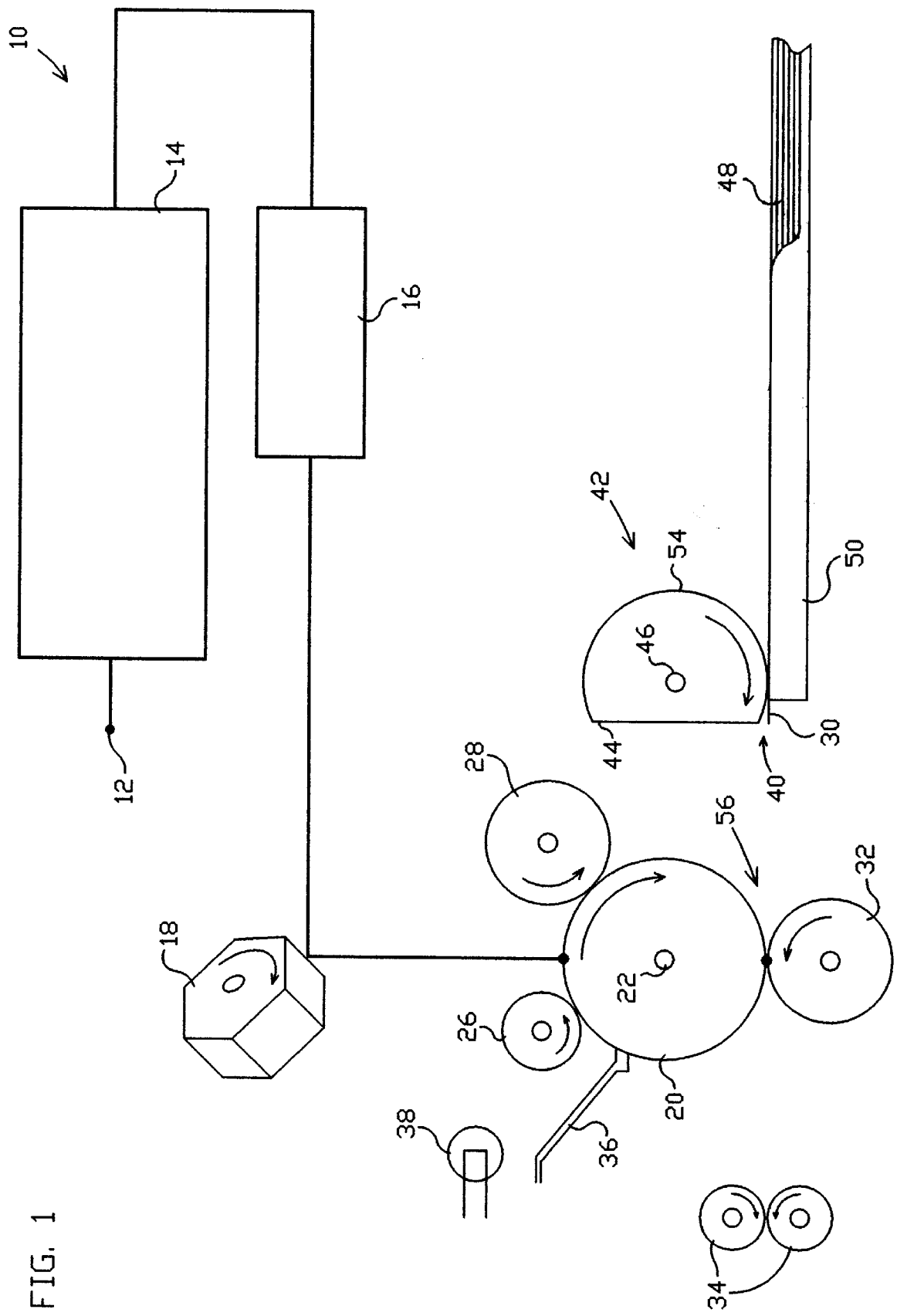
FIG. 1 is a representational diagram of a conventional laser printer.

FIG. 1 is a representational diagram of a conventional laser printer 10. Printer 10 exemplifies an image forming machine into which the present invention may be incorporated. In general, and referring to FIG. 1, a computer transmits data representing an image to input port 12 of printer 10. This data is analyzed in formatter 14, which typically consists of a microprocessor and related programmable memory and page buffer. Formatter 14 formulates and stores an electronic representation of each page that is to be printed. Once a page has been formatted, it is transmitted to the page buffer. The page buffer, usually three or more individual strip buffers, breaks the electronic page into a series of lines or "strips" one dot wide. This strip of data is then sent to a circuit that drives laser 16. Each strip of data is used to modulate the light beam produced by laser 16 such that the beam of light "carries" the data. The light beam is reflected off a multifaceted spinning mirror 18. As each facet of mirror 18 spins through the light beam, if reflects or "scans" the beam across the side of a photoconductive drum 20. Photoconductive drum 20 rotates about a motor driven shaft 22 such that it advances just enough that each successive scan of the light beam is recorded on drum 20 immediately after the previous scan. In this manner, each strip of data from the page buffer is recorded on photoconductive drum 20 as a line one after the other to reproduce the page on the drum.

The surface of photoconductive drum 20 is charged using a high voltage charging roller 26. The light beam discharges the area on drum 20 that it illuminates. This process creates a "latent" electrostatic image on drum 20. Developing roller 28 transfers toner onto photoconductive drum 20. The toner is attracted to developer roller 28 by an internal magnet. The toner particles are thereafter charged triboelectrically to have a polarity opposite the polarity of the latent image. Developer roller 28 is electrically biased to repel the charged toner to the discharge image areas on drum 20. In this way, the toner is transferred to photoconductive drum 20 to form a toner image thereon.

The toner is transferred from photoconductive drum 20 onto paper 30 as paper 30 passes between drum 20 and transfer roller 32. Transfer roller 32 is electrically biased to impart a relatively strong charge to the back side of paper 30 as it passes by drum 20. The charge on the paper attracts the oppositely charged toner and pulls it from drum 20 to form the image on paper 30. The toner is then fused to paper 30 as the paper passes between heated fusing rollers 34. The circumference of photoconductive drum 20 is usually less than the length of paper 30. Therefore, the drum must rotate several times to print a full page or sheet of paper. Drum 20 is cleaned of excess toner with cleaning blade 36, completely discharged by discharge lamps 38 and recharged by charging roller 26.

Each sheet of paper 30 is pulled into the pick/feed area 40 using a pick/feed mechanism 42. Pick/feed mechanism 42 includes a feed roller 44 that is operatively coupled to a motor driven shaft 46. Feed roller 44 preferably has a generally D shaped perimeter so that feed roller 44 does not contact the paper stack between pick/feed commands. The paper stack 48 is positioned in input tray 50 to allow sliding passage of a paper 30 into pick/feed area 40 at the urging of feed roller 44. In operation, as feed roller 44 rotates, the frictionally adherent outer surface 54 along the circular portion of the outer perimeter of feed roller 44 contacts the upper surface of paper 30 and pulls it into pick/feed area 40. As feed roller 44 continues to rotate, paper 30 is moved through pick/feed area 40 into image area 56. As the leading edge of paper 30 reaches into image area 56, it is engaged between drum 20 and transfer roller 32. Thereafter, paper 30 is moved through the print engine by drum 20/transfer roller 32 and, subsequently, fusing rollers 34.

Figure 2:
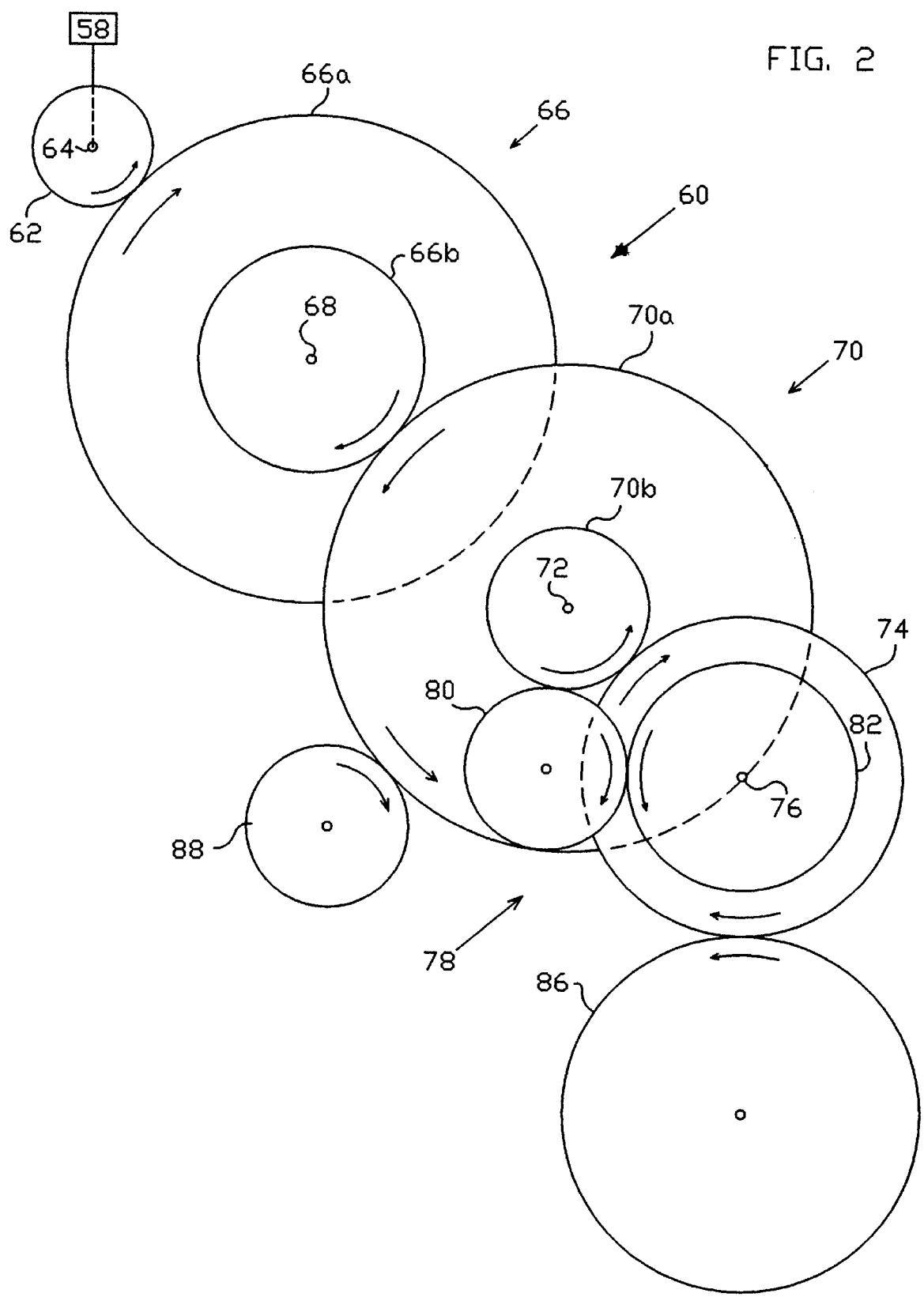
FIG. 2 is a partial side view of a laser printer drive train embodying the invented counter rotating gear control system.
Figure 3:
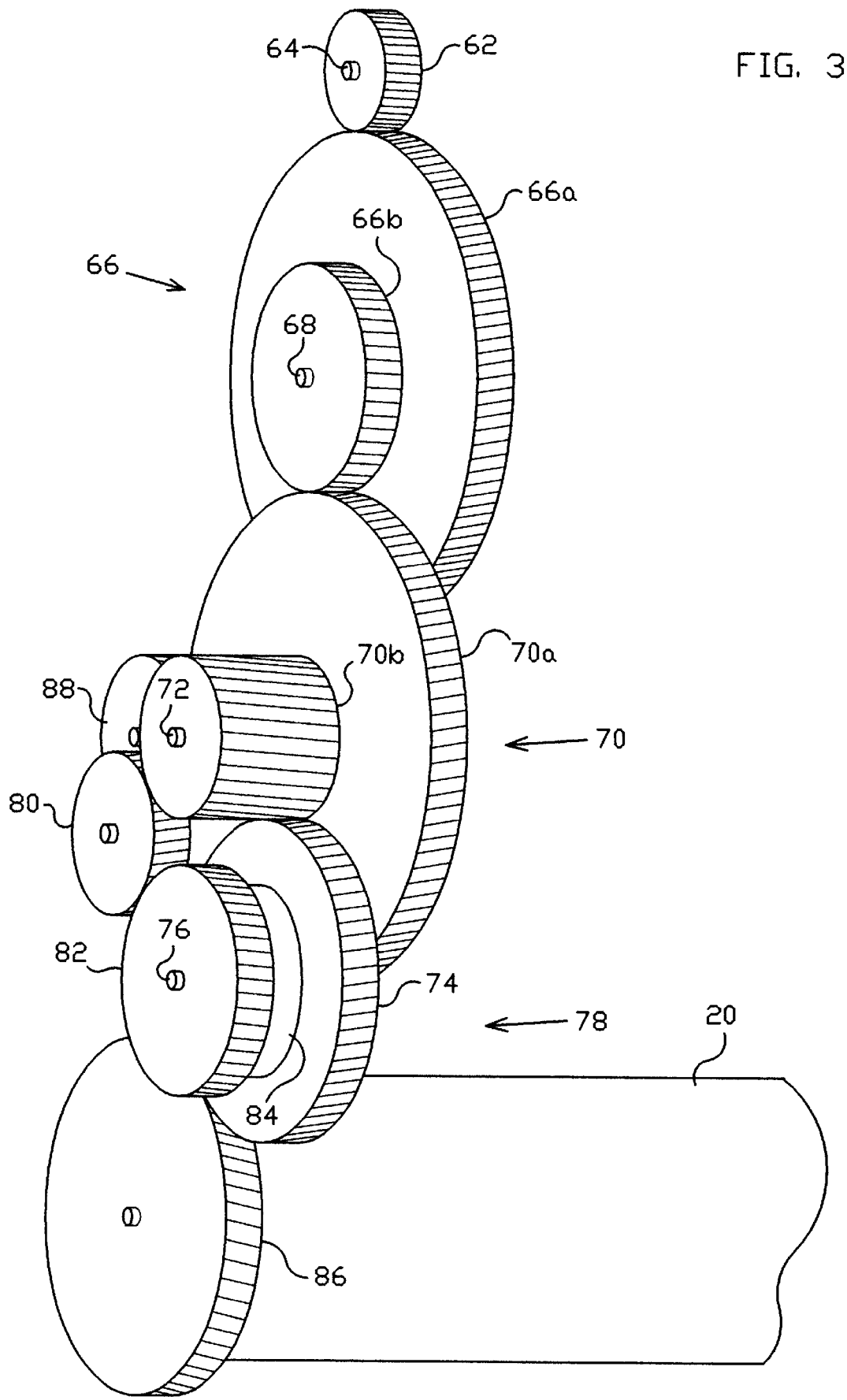
FIG. 3 is an isometric view of the drive train of FIG. 2.
Figure 4:
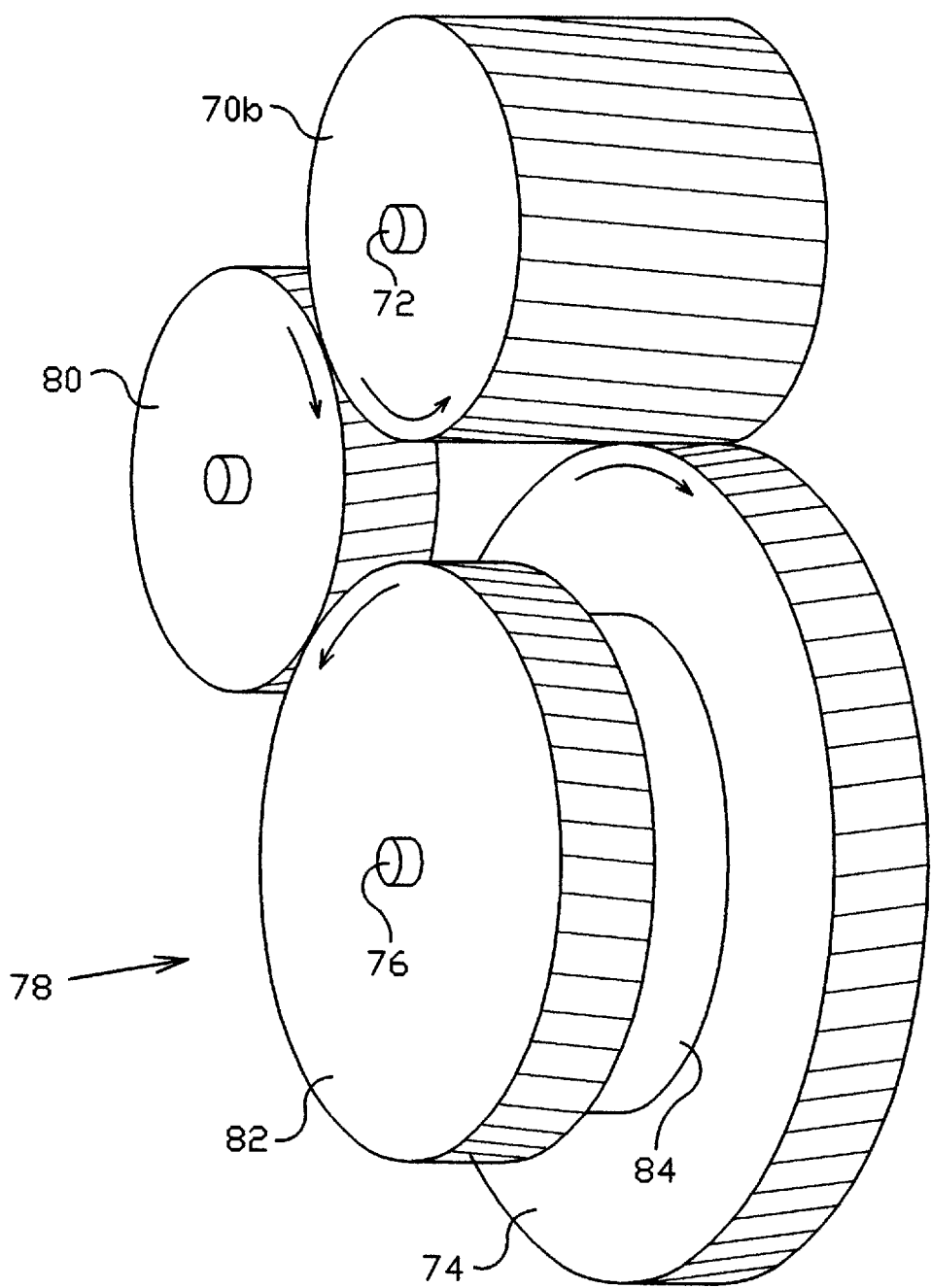
FIG. 4 is a detail isometric view of the last two sets of gears in the drive train of FIG. 3.
Figure 5:
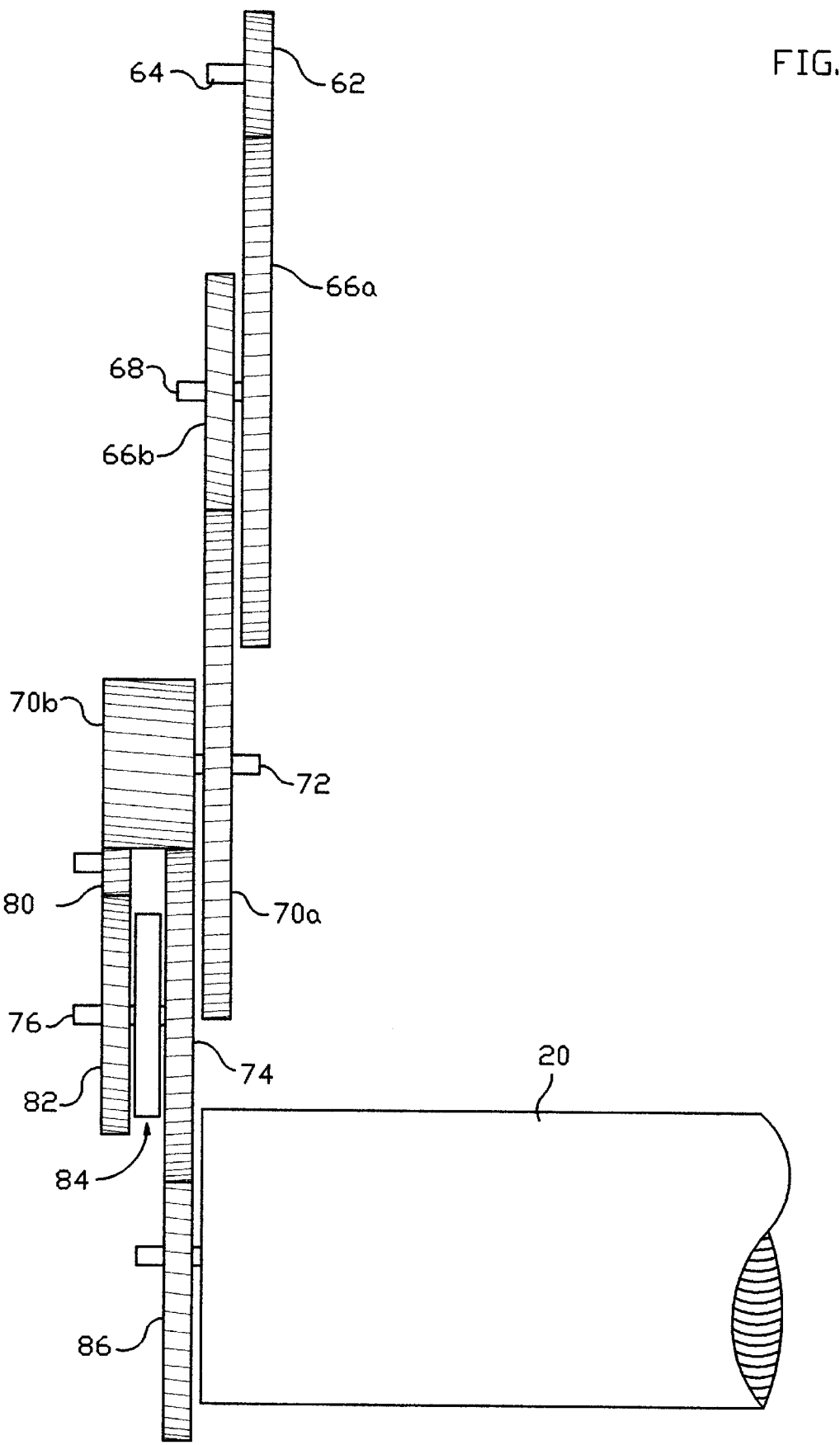
FIG. 5 is an alternate view of FIG. 3.

Referring to FIGS. 2–4, photoconductive drum 20 is driven by an electric motor 58 through gear train 60. Gear train 60 connects motor pinion gear 62 and drum gear 86. Pinion gear 62 is mounted on motor shaft 64. Drum gear 86 is mounted to photoconductive drum 20. The first set of reduction gears 66 includes first driven gear 66a and first driving gear 66b. First driven gear 66a and first driving gear 66b are mounted on a first shaft 68. The second set of reduction gears 70 includes second driven gear 70a and second driving gear 70b. Second driven gear 70a and second driving gear 70b are mounted on a second shaft 72. Drum drive gear 74, which is the last gear in gear train 60, is mounted on a third shaft 76. The invented gear train control system, designated generally by reference numeral 78, includes drive gear 80, driven gear 82 and slip clutch 84. Motor pinion gear 62 engages first driven gear 66a in the first set of reduction gears 66. First driving gear 66b in the first set of reduction gears 66 engages second driven gear 70a in the second set of reduction gears 70. Second driving gear 70b in the second set of reduction gears 70 engages drum drive gear 74 and control system drive gear 80. Drum drive gear 74 engages drum gear 86. Control system drive gear 80 engages control system driven gear 82. Control system driven gear 82 is operatively coupled to drum drive gear 74 through slip clutch 84. Also, gear train 60 is typically connected to the paper feed system as illustrated by the engagement of second driven gear 70b with paper feed take off gear 88.

Gear train 60 represents generally any conventional gear train that operatively connects the motor to the photoconductive drum. In the embodiment illustrated and described herein, gear train 60 consists of two sets of reduction gears 66, 70 and drum driving gear 74. As will be apparent to those skilled in the art, other configurations of gear train 60 are possible. For example, drum drive gear 74 and control system drive gear 80 could be engaged directly by motor pinion gear 62, thus eliminating both sets of reduction gears. Step up gears might be used alone or together with reduction gears as necessary to achieve the desired rates of rotation for any of the numerous components that may be driven off of motor pinion gear 62 through gear train 60. The configuration of the gear train actually used in a printer will depend on the performance requirements for that particular printer.

In operation, motor 58 turns drive shaft 64 to rotate motor pinion gear 62. The direction of rotation for each gear is indicated in FIG. 2 by directional arrows. Motor pinion gear 62 rotates the first set of reduction gears 66. First driving gear 66b in the first set of reduction gears 66 rotates the second set of reduction gears 70. Second driving gear 70b in the second set of reduction gears 70 rotates drum drive gear 74 and control system drive gear 80. Drum drive gear 74 rotates drum gear 86 to turn photoconductive drum 20. Control system drive gear 80 rotates driven gear 82. Thus, control system driven gear 82 is made to rotate in a direction opposite, that is, counter to drum drive gear 74. Preferably, control system driven gear 82 is made to rotate at the same rate as drum drive gear 74. That is, the gearing ratio between second driving gear 70b and control system driven gear 82 (through control system driving gear 80) is the same as the gearing ratio between second driving gear 70b and drum drive gear. For example, if the control system drive gear 80 is the same size (that is, has the same pitch) as second driving gear 70b, then driven gear 82 will be the same size as drum drive gear 74. This preferred gearing ratio provides an in-synch, counter rotating gear. Any velocity perturbations that are transmitted to drum drive gear 74 are simultaneously transmitted to control system 78 where they are inverted through the counter rotating driven gear 82 and fed back into gear train 60 via slip clutch 84. Hence, control system 78 actively attenuates velocity perturbations traveling down gear train 60. The degree to which the inverted velocity perturbation is fed back into gear train 60 is controlled by the operating parameters of slip clutch 84. The operating parameters of slip clutch 84 may be varied as necessary to achieve the desired amount of feed back.

Control system gears 80, 82 may be formed in any conventional manner. As with other gears in many printer drive trains, control system gears 80, 82 may be inexpensively fabricated as molded or hobbed plastic gears. Slip clutch 84 may be a conventional slip clutch, a controlled slip electromagnetic clutch or any other such coupling mechanism that selectively transmits some or all of the rotational force of control system driven gear 82 to drum drive gear 74.

The invention above provides a control system for actively attenuating velocity perturbations in the photoconductor drive gear train to reduce velocity induced defects in print quality. The invention may be inexpensively implemented in the printer drive train by adding two gears and a slip clutch. The system allows for the use of lower quality and therefore less expensive gears to make the drive train more resistant to the effects of velocity perturbations. While the invention has been shown and described with reference to a laser printer, it will be apparent to those skilled in the art that the invented control system may be incorporated into any of the various printers, copiers and other such image forming machines that transfer the desired image from a gear driven rotating member to the print media. Other alternative or additional forms and details of the inventon may also be made without departing from the spirit and scope of the invention as defined in the following claims.

What is claimed is:

1. A control system for reducing velocity perturbations in a drive train of the type having a driving gear in meshed engagement with a driven gear so that, upon rotation of the driving gear in a first direction, the driven gear is rotated by the driving gear in a second direction opposite the first direction, the control system comprising:
   a. a first gear in meshed engagement with the driving gear for rotation thereby in the second direction;
   b. a second gear in meshed engagement with the first gear for rotation thereby in the first direction; and
   c. a coupling mechanism operative between the driven gear in the drive train and the second gear in the control system for transmitting at least a part of the rotational force of the second gear to the driven gear.

2. A control system according to claim 1, wherein the coupling mechanism selectively transmits at least a part of the rotational force of the second gear to the driven gear.

3. A control system according to claim 1, wherein the coupling mechanism comprises a slip clutch.

4. A control system according to claim 1, wherein the driven gear in the drive train and the second gear in the control system rotate about a common axis.

5. A control system according to claim 1, wherein the driven gear in the drive train and the second gear in the control system rotate on a common shaft.

6. A control system according to claim 1, wherein the driven gear in the drive train and the second gear in the control system rotate at the same rate.

7. A control system according to claim 1, wherein a gearing ratio between the driving gear and the driven gear in the drive train is the same as the gearing ratio between the driving gear and the second gear in the control system.

8. A control system according to claim 1, wherein the first gear in the control system is the same size as the driving gear in the drive train and the second gear in the control system is the same size as the driven gear in the gear train.

9. A drive train having a control system for reducing velocity perturbations therein, the drive train comprising:
   a. a driving gear;
   b. a drive mechanism operatively coupled to the driving gear for rotating the driving gear in a first direction;
   c. a driven gear in meshed engagement with the driving gear for rotation thereby in a second direction opposite the first direction;
   d. a control system comprising a first gear in meshed engagement with the driving gear for rotation thereby in the second direction, a second gear in meshed engagement with the first gear for rotation thereby in the first direction, and a coupling mechanism operative between the driven gear in the drive train and the second gear in the control system for transmitting at least a part of the rotational force of the second gear to the driven gear.

10. A drive train according to claim 8, wherein the coupling mechanism selectively transmits at least a part of the rotational force of the second gear to the driven gear.

11. A drive train according to claim 9, wherein the coupling mechanism comprises a slip clutch.

12. A drive train according to claim 9, wherein the driven gear in the drive train and the second gear in the control system rotate about a common axis.

13. A drive train according to claim 9, wherein the drive mechanism comprises an electric motor.

14. A drive train according to claim 9, wherein the drive mechanism is coupled to the driving gear through at least one set of gears.

15. An image forming machine having a drive train control system for reducing velocity induced image defects, the machine comprising:
   a. a driving gear;
   b. an electric motor operatively coupled to the driving gear for rotating the driving gear in a first direction;
   c. a driven gear in meshed engagement with the driving gear for rotation thereby in a second direction opposite the first direction;
   d. a control system comprising a first gear in meshed engagement with the driving gear for rotation thereby in the second direction, a second gear in meshed engagement with the first gear for rotation thereby in the first direction, and a coupling mechanism operative between the driven gear in the drive train and the second gear in the control system for selectively transmitting at least a part of the angular momentum of the second gear to the driven gear; and e. a print engine for projecting an image on to a page of print media, the print engine having a rotatable member for holding a latent image, the rotatable member being operatively coupled to the driven gear for rotation thereby.

16. A machine according to claim 15, further comprising:

a. a print media supply mechanism operatively coupled to the print engine for supplying pages of print media to the print engine;

b. a formatter operatively coupled to the print engine for supplying data representing a desired print image to the print engine; and c. a printed page output mechanism operatively coupled to the print engine for outputting printed pages from the print engine.

* * * * *